(12) United States Patent
Nakahara et al.

(10) Patent No.: US 7,401,248 B2
(45) Date of Patent: Jul. 15, 2008

(54) METHOD FOR DECIDING SERVER IN OCCURRENCE OF FAULT

(75) Inventors: Yasuhiro Nakahara, Yokohama (JP); Kunihisa Nitta, Zama (JP)

(73) Assignee: Hitachi, Ltd., Tokyo (JP)

( * ) Notice: Subject to any disclaimer, the term of this patent is extended or adjusted under 35 U.S.C. 154(b) by 793 days.

(21) Appl. No.: 10/981,193

(22) Filed: Nov. 4, 2004

(65) Prior Publication Data

US 2005/0193227 A1  Sep. 1, 2005

(30) Foreign Application Priority Data

Feb. 20, 2004  (JP)  ............................. 2004-043828

(51) Int. Cl.
*G06F 11/00* (2006.01)
(52) U.S. Cl. ................. 714/4; 714/1; 717/171
(58) Field of Classification Search ................ 714/4, 714/1, 13; 709/203; 717/171–173, 176, 717/178
See application file for complete search history.

(56) References Cited

U.S. PATENT DOCUMENTS

| | | | |
|---|---|---|---|
| 5,852,724 A | 12/1998 | Glenn et al. | |
| 6,453,468 B1 * | 9/2002 | D'Souza | 717/168 |
| 7,082,553 B1 * | 7/2006 | Wang | 714/38 |
| 7,103,619 B1 * | 9/2006 | Rajpurkar et al. | 707/204 |
| 2003/0204647 A1 * | 10/2003 | Jacobs et al. | 709/330 |
| 2003/0220990 A1 * | 11/2003 | Narayanan et al. | 709/220 |
| 2004/0117438 A1 * | 6/2004 | Considine et al. | 709/203 |

* cited by examiner

*Primary Examiner*—Dieu-Minh Le
(74) *Attorney, Agent, or Firm*—Hogan & Hartson LLP

(57) ABSTRACT

A method for deciding a destination server among a plurality of servers to which applications are migrated upon occurrence of a failure on one of the servers is provided. The method includes the steps of obtaining required performance information of each of the applications when each of the plurality of servers is normally operating, obtaining furnishing performance information of each of the plurality of servers in operation, specifying at least one of the servers having a composition capable of running the applications migrated upon occurrence of a failure on one of the servers, comparing the required performance information and the furnishing performance information, and specifying one of the servers that has an application execution performance closest to an application execution performance on the server having the failure, and that meets a specified availability.

22 Claims, 12 Drawing Sheets

FIG. 9 REQUIRED PERFORMANCE INFORMATION TABLE

| SERVER IDENTIFIER | APPLICATION IDENTIFIER | MULTIPLICITY | PERFORMANCE INFORMATION 1 | PERFORMANCE INFORMATION 2 | PERFORMANCE INFORMATION 3 | PERFORMANCE INFORMATION 4 |
|---|---|---|---|---|---|---|
| S1 | A1 | 1 | T11 | T12 | T13 | T14 |
| S1 | A1 | 2 | T21 | T22 | T23 | T24 |
| S1 | A1 | 8 | T31 | T32 | T33 | T34 |
| S1 | A2 | 1 | T41 | T4 | T43 | T44 |
| S1 | A3 | 4 | T51 | T52 | T53 | T54 |
| S2 | A2 | 1 | T61 | T62 | T63 | T64 |
| S3 | A3 | 4 | T71 | T72 | T73 | T74 |
| ⋮ | | | | | | |

FIG. 10 FURNISHING PERFORMANCE INFORMATION TABLE

| SERVER IDENTIFIER | MULTIPLICITY | PERFORMANCE INFORMATION 1 | PERFORMANCE INFORMATION 2 | PERFORMANCE INFORMATION 3 | PERFORMANCE INFORMATION 4 |
|---|---|---|---|---|---|
| S1 | 1 | U11 | U12 | U13 | U14 |
| S1 | 4 | U21 | U22 | U23 | U24 |
| S2 | 1 | U31 | U32 | U33 | U34 |
| S2 | 2 | U41 | U42 | U43 | U44 |
| S2 | 4 | U51 | U52 | U53 | U54 |
| S2 | 8 | U61 | U62 | U63 | U64 |
| S3 | 1 | U71 | U72 | U73 | U74 |
| S3 | 2 | U81 | U82 | U83 | U84 |
| S3 | 4 | U91 | U92 | U93 | U94 |
| S3 | 8 | UA1 | UA2 | UA3 | UA4 |
| ⋮ | | | | | |

FIG. 11

| APPLICATION IDENTIFIER | WEIGHT 1 | WEIGHT 2 | WEIGHT 3 | WEIGHT 4 | CONTINUOS EXECUTION TIME | FAILURE EVENT RATE UPPER LIMIT |
|---|---|---|---|---|---|---|
| A1 | 1.0 | 1.0 | 0.2 | 2.0 | FAILURE RATE | UPPER LIMIT |
| A2 | 1.0 | 0.0 | 1.0 | 0.1 | FAILURE RATE | UPPER LIMIT |
| A3 | 0.0 | 1.0 | 0.0 | 0.5 | FAILURE RATE | UPPER LIMIT |
| ⋮ | | | | | | |

FIG. 12   SERVER COMPOSITION INFORMATION TABLE
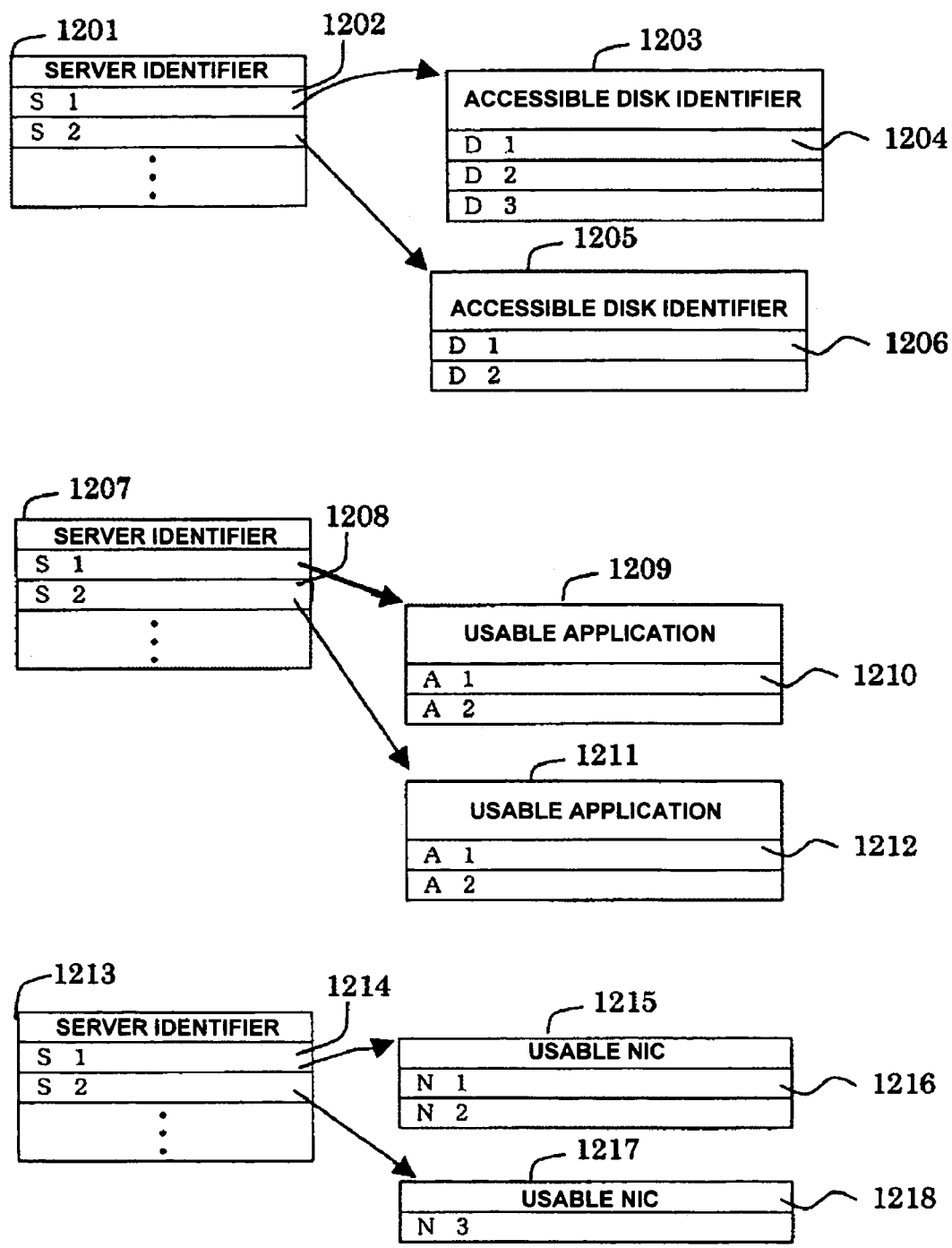

FIG. 13  APPLICATION RESOURCE INFORMATION TABLE

| SERVER IDENTIFIER | APPLICATION IDENTIFIER | DISK USED | IP ADDRESS | MEMORY AMOUNT USED |
|---|---|---|---|---|
| S1 | A1 | A1 | I1 | M1 |
| S1 | A2 | A2 | I2 | M2 |
| S2 | A3 | A1 | I3 | M3 |
| ⋮ | | | | |

FIG. 14  FAILURE INFORMATION TABLE

| SERVER IDENTIFIER | ACCIDENTAL FAILURE RATE λ | INCREASED FAILURE RATE COEFFICIENT a | INCREASED FAILURE RATE COEFFICIENT b | ELAPSED TIME AFTER MANUFACTURE | ELAPSED TIME AFTER START UP |
|---|---|---|---|---|---|
| S1 | FAILUER RATE | COEFFICIENT | COEFFICIENT | TIME | TIME |
| S2 | FAILUER RATE | COEFFICIENT | COEFFICIENT | TIME | TIME |
| ⋮ | | | | | |

METHOD FOR DECIDING SERVER IN OCCURRENCE OF FAULT

BACKGROUND OF THE INVENTION:

1. Field of the Invention

The present invention relates to a method for deciding an optimum server to which applications are to be migrated in the event of a failure of a currently-active server.

2. Description of the Related Art

In recent years, more performance improvements and high availability have been increasingly achieved by clustering applications. In particular, cluster systems using a SAN (Storage Area Network) achieve continual management by failover and cascade failover in the event of failures.

With the SAN, it is easy for a plurality of servers to access the same storage that composes clusters. As a result, when a failure occurs in a server, the server can be switched flexibly to any one of the other servers.

For example, U.S. Pat. No. 5,852,724 describes a technology in which several spare servers are prepared for a plurality of servers, and when a failure occurs in a specific server, applications are migrated to one of the spare servers. Even when a spare server is not prepared, applications running on a server that experiences a failure can be operated on another server in operation. Also, there are products having a function to select one of a plurality of servers in operation which has a lower workload when applications are to be migrated from a failed server to another server in operation. For example, VERITAS Cluster Server (VERITAS White Paper, *Managing Application Availability with Application Clustering and the VERITAS Cluster Server* 2.0) uses such a function.

When an application is migrated to another server in operation, there may be an influence on the performance of applications running on the other server due to an increased workload. Even when such an influence is not a problem, there is still an issue as to whether the other server to which the application is migrated has a sufficient computer resource required by the application to be migrated.

There are also some examples that implement a workload distribution method of migrating applications to a server with the lightest workload. Moreover, there is also a conventional technology in which the workload of a server is guessed based on the response time and the like in communications in HTTP. However, even when an application is migrated to a server with a relatively short response time, it is not certain if an expected response time can be achieved when the application is actually executed on the server. Because applications generally have characteristics such as CPU-bound, I/O-bound and the like, guessing the workload simply based on the CPU busy rate and the response time in communications in HTTP does not guarantee if an expected response time can always be achieved when a target application is actually executed.

Furthermore, at the time of failover, there may be cases where it is more preferable to continue the services in the state of performance equal to that before occurrence of a failure rather than switching a failed server to a server with the lightest workload. For example, when the workload is distributed by a load balancer, the load balancer may detect a switching destination server with a greater performance as having a room of resources and may increase the amount of request allocations. However, such a situation may slow down responses to the users, and therefore is not desirous to many of the users. To begin with, it is obviously unnatural that the performance of an application improves with an event of failure as a momentum, and different countermeasures are necessary for failover and load distribution at the time of failures.

Generally speaking, in migrating applications operating on one server to another server in the event of a failure, it is considered that the fewer the changes in all aspects including the performance (except the availability) before and after the occurrence of the failure (thereby maintaining the invariability at its maximum before and after the occurrence of the failure), the more dominant in terms of safety. This is contrasted with the idea of load distribution that starts terminating the execution of applications as soon as possible. Moreover, when applications are to be migrated to another server, it is necessary to choose a server whose reliability is high (whose event probability of failures is low) as much as possible.

There is no conventional technology that achieves both performance invariability before and after occurrence of a failure and availability improvement after the failure. Especially, there are technical difficulties in the method for maintaining performance invariability before and after occurrence of a failure. This is because a server that was in operation before a failure and a server that is in operation after the failure may not be the same in various aspects such as the CPU performance, the number of CPUs, the I/P performance, and the like, and a destination server to which the application is migrated may already be running other applications, and therefore it is not possible to predict the performance of the destination server after the application is migrated.

SUMMARY OF THE INVENTION

It is an object of the present invention to provide a method for deciding an optimum destination server to which applications are migrated, which achieves, in the event of a failure, both performance invariability before and after the failure and availability improvement after the failure.

An embodiment of the present invention pertains to a method for deciding a destination server among a plurality of servers to which applications are migrated upon occurrence of a failure of one of the servers, wherein the method includes the steps of executing test programs having a plurality of different characteristics while changing an execution multiplicity of each of the test programs, thereby obtaining required performance information of each of the applications when each of the plurality of servers is normally operating, obtaining furnishing performance information of each of the plurality of servers in operation to extract at least one of the servers as a representative server from among the plurality of servers to which the applications may be migrated; comparing the required performance information and the furnishing performance information, thereby specifying at least one of the servers having an application execution performance that is close to an application execution performance on the server having the failure; and deciding one of the servers specified as the destination server that has a minimum load change after migration of the applications.

As a result, when applications that are operating on a server at the time of a failure are migrated (failed over) to another server, changes in the application performance before and after the migration can be minimized. In other words, the overall application performance except the availability can be made unchanged as much as possible before and after migrating the applications. In particular, the performance that is most suitable to each of the applications can be maintained.

Moreover, applications that are operating on a failed server can be migrated to other servers, while influences on other servers that are operating without a failure are suppressed.

Furthermore, servers having a high failure event probability and the hardware lifetime of the servers are managed based on failure information. As a result, for deciding a server at a migration destination, servers that are more difficult to have a failure can preferentially selected.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 9 shows a required performance information table stored in a storage that is accessible from a group of failure management target servers and failure management server.

FIG. 10 shows a furnishing performance information table stored in a storage that is accessible from a group of failure management target servers and failure management server.

FIG. 11 shows an application characteristic information table stored in a storage that is accessible from a group of failure management target servers and failure management server.

FIG. 12 shows a server composition information table stored in a storage that is accessible from a group of failure management target servers and failure management server.

FIG. 13 shows an application resource information table stored in a storage that is accessible from a group of failure management target servers and failure management server.

FIG. 14 shows a failure information table stored in a storage that is accessible from a group of failure management target servers and failure management server.

DESCRIPTION OF THE PREFERRED EMBODIMENT

Embodiments of the present invention are described below in detail with reference to the accompanying drawings.

Figure 1:
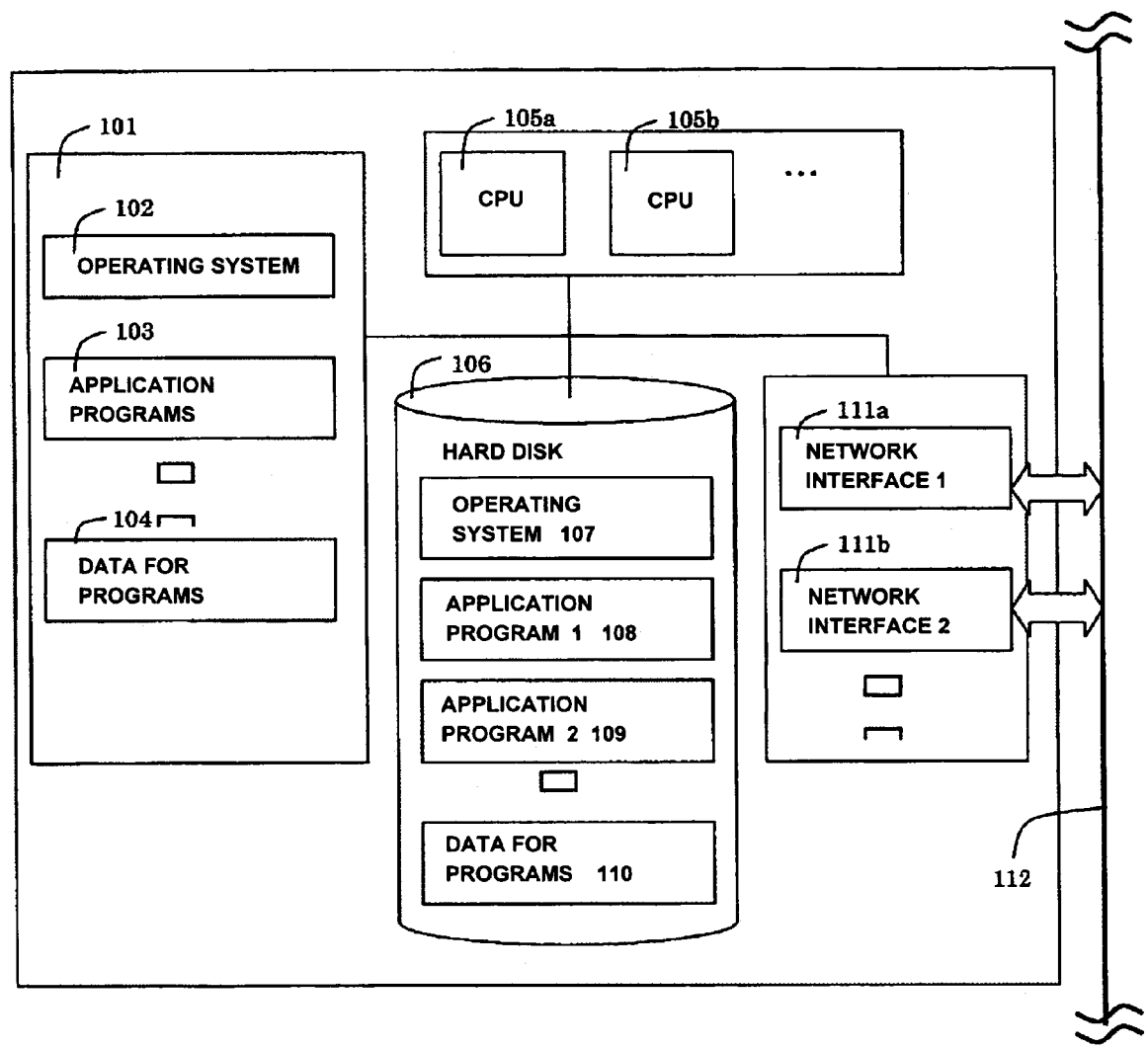
FIG. 1 is a structural diagram of a server in accordance with an embodiment of the present invention.

FIG. 1 is a diagram illustrating a structure of a server in accordance with an embodiment of the present invention.

Referring to FIG. 1, a server 100 includes one or more CPUs (for example, 105a, 105b), a memory 101, a storage device, such as, a hard disk 106, and one or more network interfaces (for example, 111a, 111b). The hard disk 106 includes an operating system 107, application programs (for example, 108, 109), and data 110 for the programs. When the server 100 is operated, the operating system 102, the application programs 103, and the data for the programs 104 are read to the memory 101. The server 100 is connected to a LAN 112 via the network interfaces (for example, 111a, 111b). The present invention is carried out by operating the server 100 according to the programs that are described in detail below.

Figure 2:
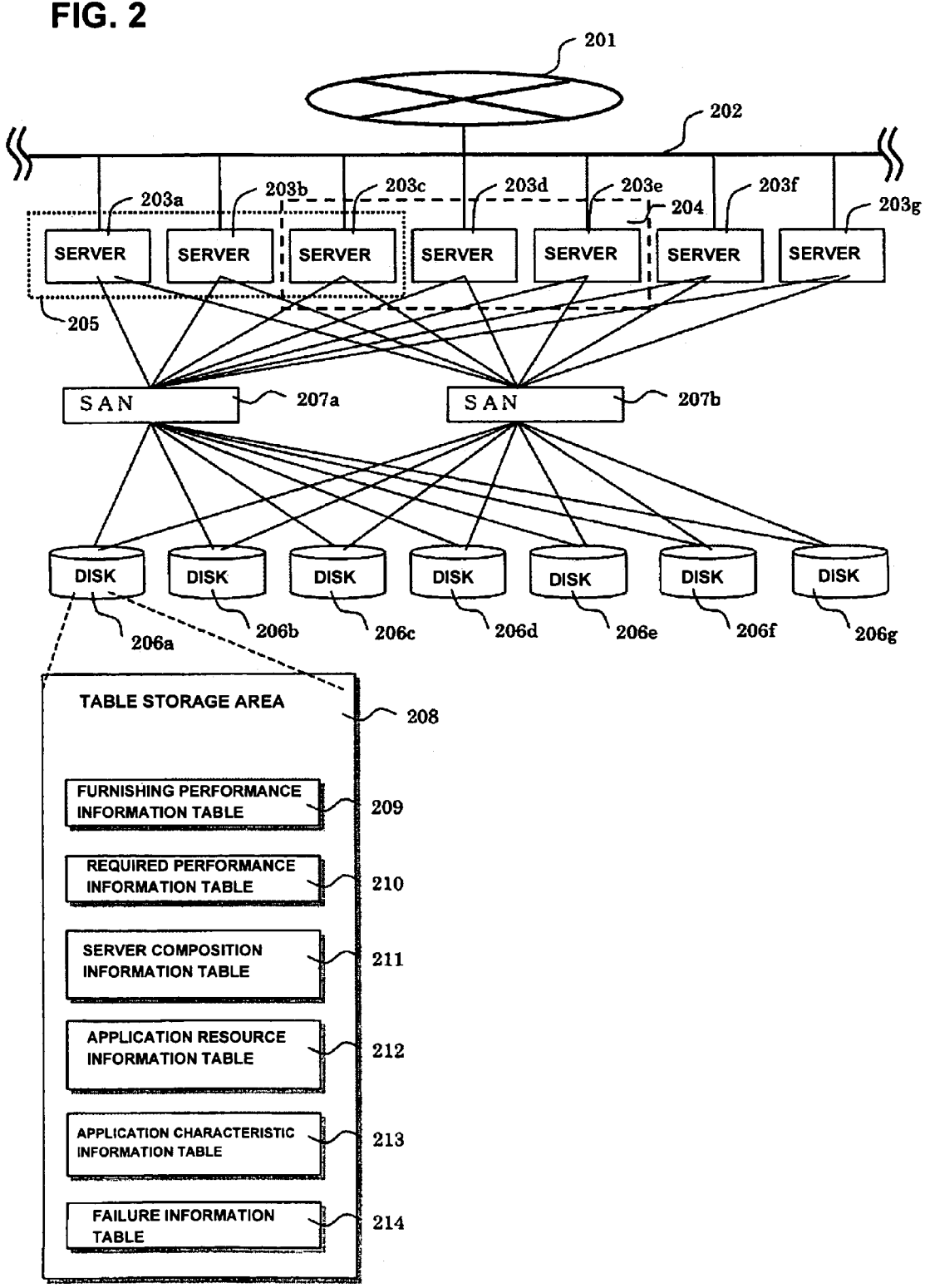
FIG. 2 is a structural diagram showing the relation between a failure management server, a group of failure management target servers that are subject to failure management, and a group of storages (e.g., disks) in accordance with an embodiment of the present invention.

FIG. 2 shows an overall configuration of server groups and storage groups (i.e., disk groups) in accordance with an embodiment of the present invention. Referring to FIG. 2, a plurality of servers (203a-203g) are connected to a local area network (LAN) 202, which is connected to an external network 201. A plurality of applications are executed on the group of servers (203a-203g) which are subject to failure management (hereafter referred to as "failure management target servers"). The applications may include applications that are operated on two or more servers in clusters and applications that are operated on each individual server. Moreover, two or more different applications may be operated on one server. The servers may include those with various kinds of hardware such as single processors, multiprocessors (shared memories, non-shared memories) and the like existing together. Also, a plurality of different operating systems may exist together on the servers.

The present invention manages failures of the applications and servers, and each of the applications may be executed on a single server (for example, the server 203f in FIG. 2), or may be executed on a cluster of multiple servers (for example, 204, 205 and the like). All of the servers 203a-203g are connected to storages (i.e., disks) 206a-206g via storage area networks (SANs) (for example, 207a, 207b and the like).

To simplify the description, the server 203g is assumed to be a failure management server, and the servers 203a through 203f are assumed to be failure management target servers that are subject to failure management. A program for acquiring performance information (performance information acquisition program) is started on each of the failure management target servers (the servers 203a through 203f). The performance information acquisition program operates predetermined test programs and measures elapsed times for operating the respective test programs, to thereby acquire performance information of the servers, respectively. Measurement of performance information is executed at predetermined time intervals.

There are two types of performance that are obtained as follows:

1) Required performance: This is effective performance that a currently-operated application uses. To measure the required performance, the application is temporarily stopped or suspended, and the performance information acquisition program is executed. An elapsed time obtained as a result of executing the program is called required performance information of the application on the server.

2) Furnishing performance: This is effective performance that can be provided to an application when the application is started anew on a server. Information of the performance can be obtained simply by executing the performance information acquisition program on the server that is subject to measurement of performance. An elapsed time obtained as a result of executing the program is called furnishing performance information of the server.

The acquired performance information is recorded on the storage (e.g., 206a) that can be accessed by the failure management server 203g. In the meantime, failure check (health check) of the failure management target servers (the servers 203a-203f) are conducted through communications via the LAN using an available technology such as heartbeats.

The storage (e.g., 206a) includes a failure management table storage area 208, as shown in FIG. 2. The failure management table needs to be accessible by the group of failure management target servers (203a-203f) and the failure management server 203g.

When execution of applications is switched in the event of a failure or error condition onto another server that is already running applications, the failure management server 203g uses tables in the failure management table storage area 208 of the storage 206a, and decides an optimum migration destination server to which the execution of application is switched.

The failure management table storage area 208 includes a furnishing performance information table 209, a required performance information table 210, a server composition information table 211, an application resource information table 212, an application characteristic information table 213, and a failure information table 214.

Details of the furnishing performance information table 209 are shown in FIG. 10. Details of the required performance information table 210 are shown in FIG. 9. Details of the server composition information table 211 are shown in FIG. 12. Details of the application resource information table 212 are shown in FIG. 13. Details of the application characteristic information table 213 are shown in FIG. 11. Details of the failure information table 214 are shown in FIG. 14.

FIG. 9 is a required performance information table 901 of applications. This table includes attributes such as server identifier 902, application identifier 903, multiplicity 904, and performance information 1 (905) —performance information 4 (908). How much computer resource is being used by each application that is operating on a certain server can be acquired from the required performance information table 210. For example, from a row 909 of the table in FIG. 9, it is understood that an application A1 of a server with a server identifier S1 is using a computer resource that provides measurement results (performance information 1-4) of T21, T22, T23 and T24 when test jobs 1-4 are executed with a multiplicity of 2.

FIG. 10 shows a furnishing performance information table 1001. This table indicates a computer resource that can be currently used on a certain server. In other words, when an application is started anew on a server, the table indicates effective computer performance that the application can presently use on the server. For example, a row 1008 of the table in FIG. 10 indicates that, when a server with a server identifier S2 executes the performance information acquisition program with an execution multiplicity of 1, a computer performance that provides execution results (elapsed times) of U31, U32, U33 and U34 upon execution of test programs 1-4 can be used (furnished) on the server.

FIG. 11 shows an application characteristic information table 1101 indicating performance characteristics and availability requirements of applications. First, FIG. 11 indicates the performance characteristics in weight value 1103-1106. These values in the table quantitatively represent characteristics of applications such as I/O-bound, CPU-bound, parallel executable, non-parallel executable, and the like corresponding to the respective characteristics of test programs. For example, if an application is I/O-bound, the attribute values of weight 3 and weight 4 may be made greater. If an application is CPU-bound, the attribute values of weight 1 and weight 2 may be made greater. If an application is a parallel executable program, the attribute values of weight 1 and weight 3 may be made greater. As a result, even when there are a plurality of applications that are to be managed, and the characteristics of these applications are different, an appropriate migration destination according to the corresponding characteristic can be decided for each of the plurality of applications that may encounter failures. Continuous execution times 1107 and failure rate upper limits 1108 in FIG. 11 each indicate the time to continuously execute each application and an upper limit of the failure event rate set thereto, respectively.

The server composition information table of FIG. 12 stores information concerning the composition (static information) of each server on each kind of resources that compose the server. The information includes identifier information of accessible storages, a list of information on applications that can be used, a list of information on NICs (network interface cards) that can be used. Each of the tables shown in FIG. 12 is described in detail below.

FIG. 13 shows an application resource information table 1301. The table 1301 includes in its rows 1307 a list of storage resources 1304, a list of IP addresses, and the amounts of memory to be used 1306, which are required by applications 1303 operating on the respective servers with server identifiers 1302.

FIG. 14 shows a failure information management table 1401, which stores information concerning failures of each of the servers. Attributes of this table 1401 include a chance failure rate $\lambda$ (1403) for describing the probability of a failure that occurs by accident, coefficient a (1404) and coefficient b (1405) that are parameters of Weibull distribution that describes the lifetime of each computer stochastically.

Also, the table 1401 stores elapsed times 1406 elapsed since products (servers) are manufactured, and elapsed times 1407 elapsed after starting (including restarting at failure recovery) applications.

Figure 3:
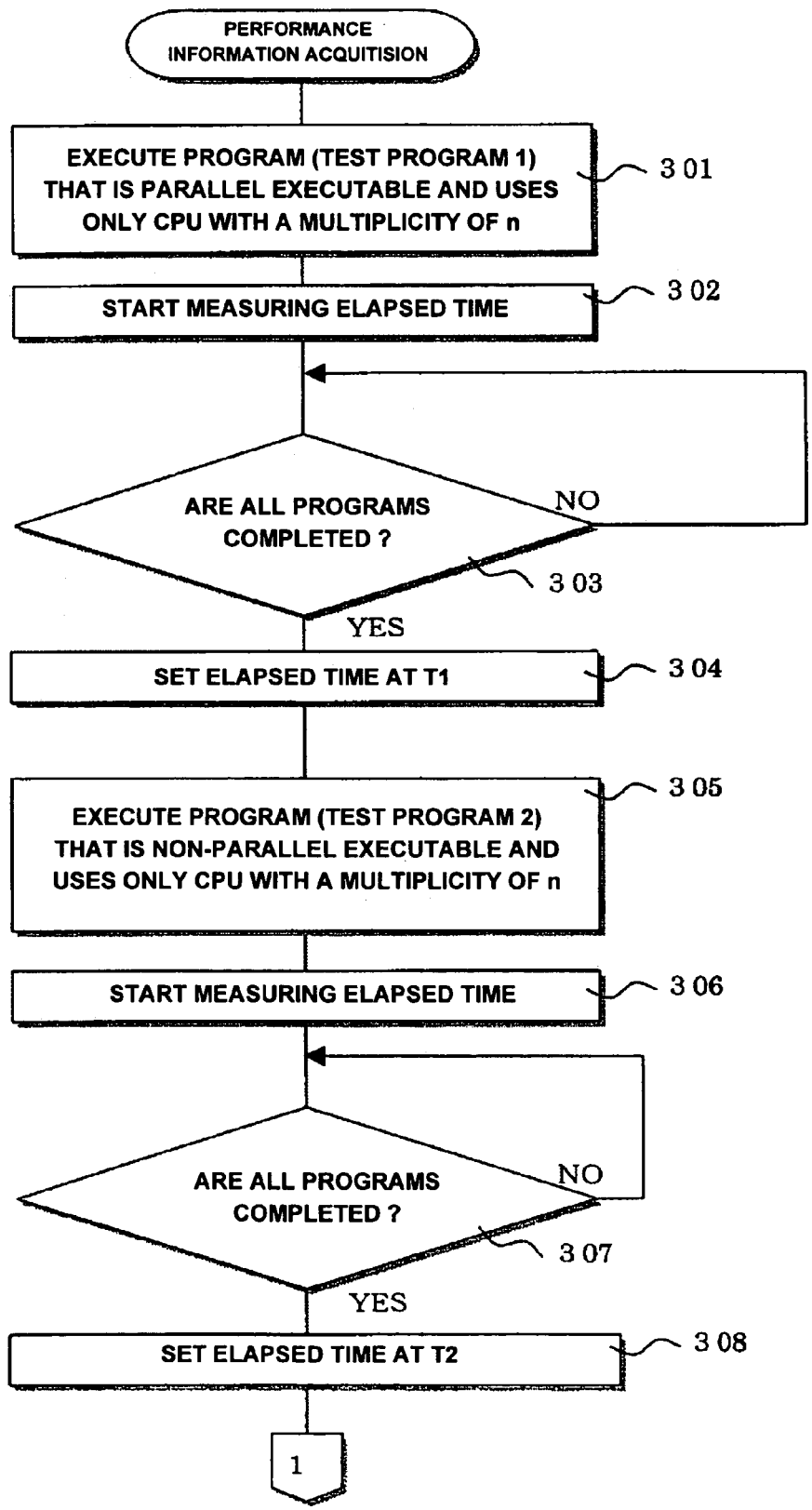
FIG. 3 is a flowchart for describing a performance information acquisition program that is executed on a failure management target server.
Figure 4:
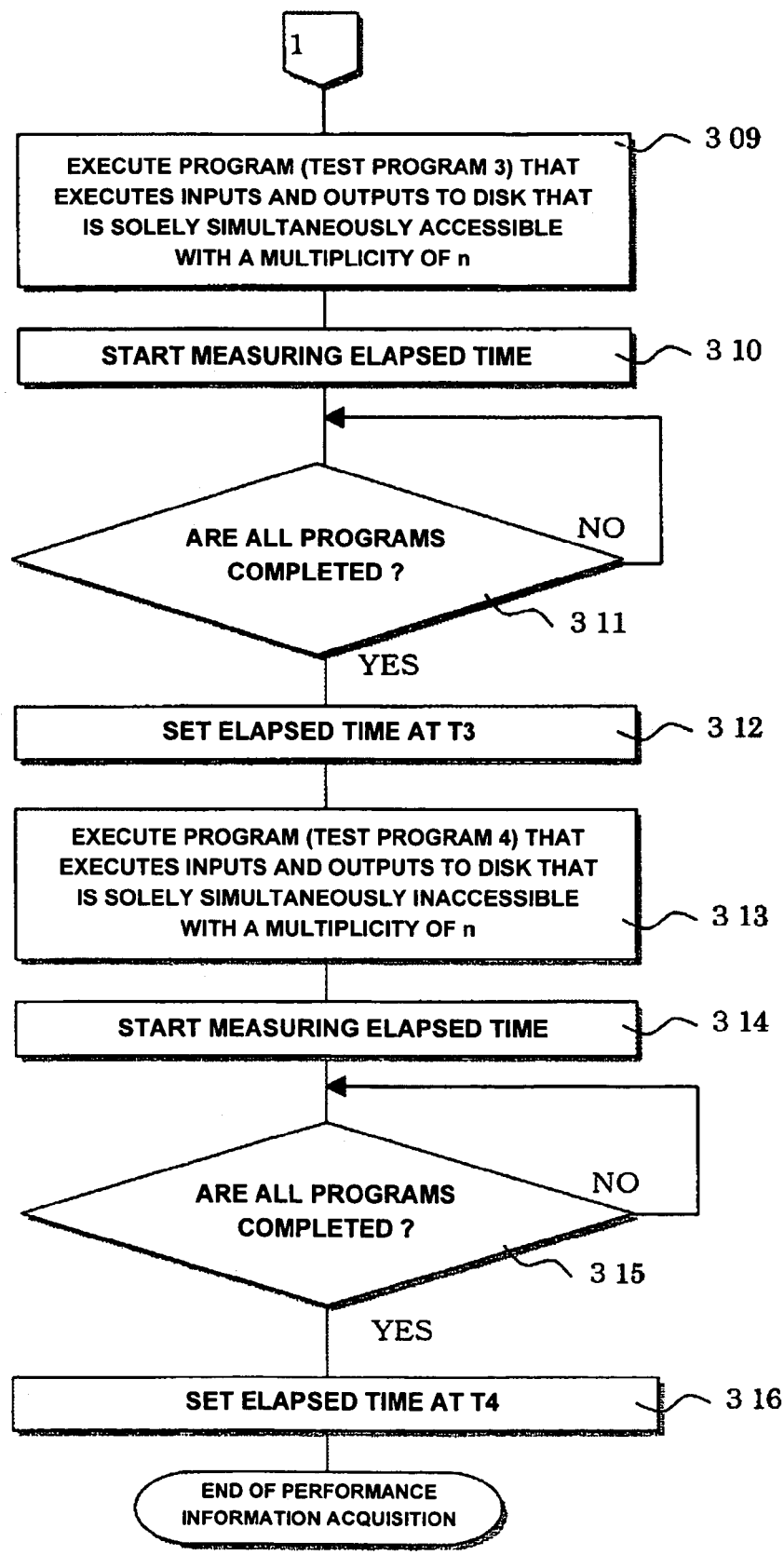
FIG. 4 is a flowchart for describing a performance information acquisition program that is executed on a failure management target server.

FIG. 3 and FIG. 4 show a flowchart to describe operations of the performance information acquisition program that commonly operates on a failure management server (the server 203g in FIG. 2) and failure management target servers (the servers 203a through 203f in FIG. 2). An execution multiplicity of n to execute test programs is given as an input to the performance information acquisition program.

In step 301, programs (test programs 1) that are parallel executable and use only CPUs are simultaneously executed with a multiplicity of n. In step 302, measurement of elapsed times is started. The process proceeds to step 304 when all of the test programs 1 with the multiplicity of n are completed, but returns to step 303 again if they are not completed, and waits until all of the test programs 1 are completed. In step 304, elapsed times are set at variables T1. It is noted here that the test program 1 is a program that is artificially created to include only processings that only use a CPU, such as, operation, comparison, etc. Also, being parallel executable means that, when a shared resource is not used, and a server is a multiprocessor type, a processing can be executed in parallel by a plurality of CPUs.

In step 305, programs (test programs 2) that are non-parallel executable and use only CPUs are simultaneously executed with a multiplicity of n. In step 306, measurement of elapsed times is started. A non-parallel executable program is a program that cannot be executed in parallel when processings are simultaneously executed with a multiplicity of 2 or greater because of certain reasons, for example, because a shared resource is used. The process proceeds to step 308 when all of the test programs 2 with the multiplicity of n are completed in step 307, but returns to step 307 again if they are not completed, and waits until all of the test programs 2 are completed. In step 308, elapsed times are set at variables T2.

In step 309, programs (test programs 3), that execute inputs and outputs to storages that are simultaneously accessible, are simultaneously executed with a multiplicity of n. The test program 3 is a program that accesses different data such that an exclusion waiting does not occur when processings are executed with a multiplicity of 2 or greater. In step 310, measurement of elapsed times is started. The process proceeds to step 312 when all of the test programs 3 are completed in step 311, but returns to step 311 again if they are not completed, and waits until all of the test programs 3 are completed. In step 312, elapsed times are set at variables T3.

Accesses to a storage depends on the amount of data accessed at each time. Also, the access rates are usually different in writing and reading. Accordingly, a test program that changes the data amount at each access, a test program that executes only writing or reading, or the like may be created, and such programs can be used instead of the test program 3. In this manner, the program can be readily expanded to obtain more detailed performance data.

In step 313, programs (test programs 4), that execute inputs and outputs to storages that cannot be accessed simultaneously, are simultaneously executed with a multiplicity of n. The test program 4 is a program that cannot make inputs and outputs in parallel when accessing the same data when the test program is executed with a multiplicity of 2 or greater. In step 314, measurement of elapsed times is started. The process proceeds to step 316 when all of the test programs 4 are completed in step 315, but returns to step 315 again if they are not completed, and waits until all of the test programs 4 are completed. In step 316, elapsed times are set at variables T4.

As a result of execution of the performance information acquisition program described above, four elapsed times T1, T2, T3 and T4 by the four test programs 1-4 in different execution modes can be obtained. These values are given to the program that called the performance information acquisition program.

Figure 5:
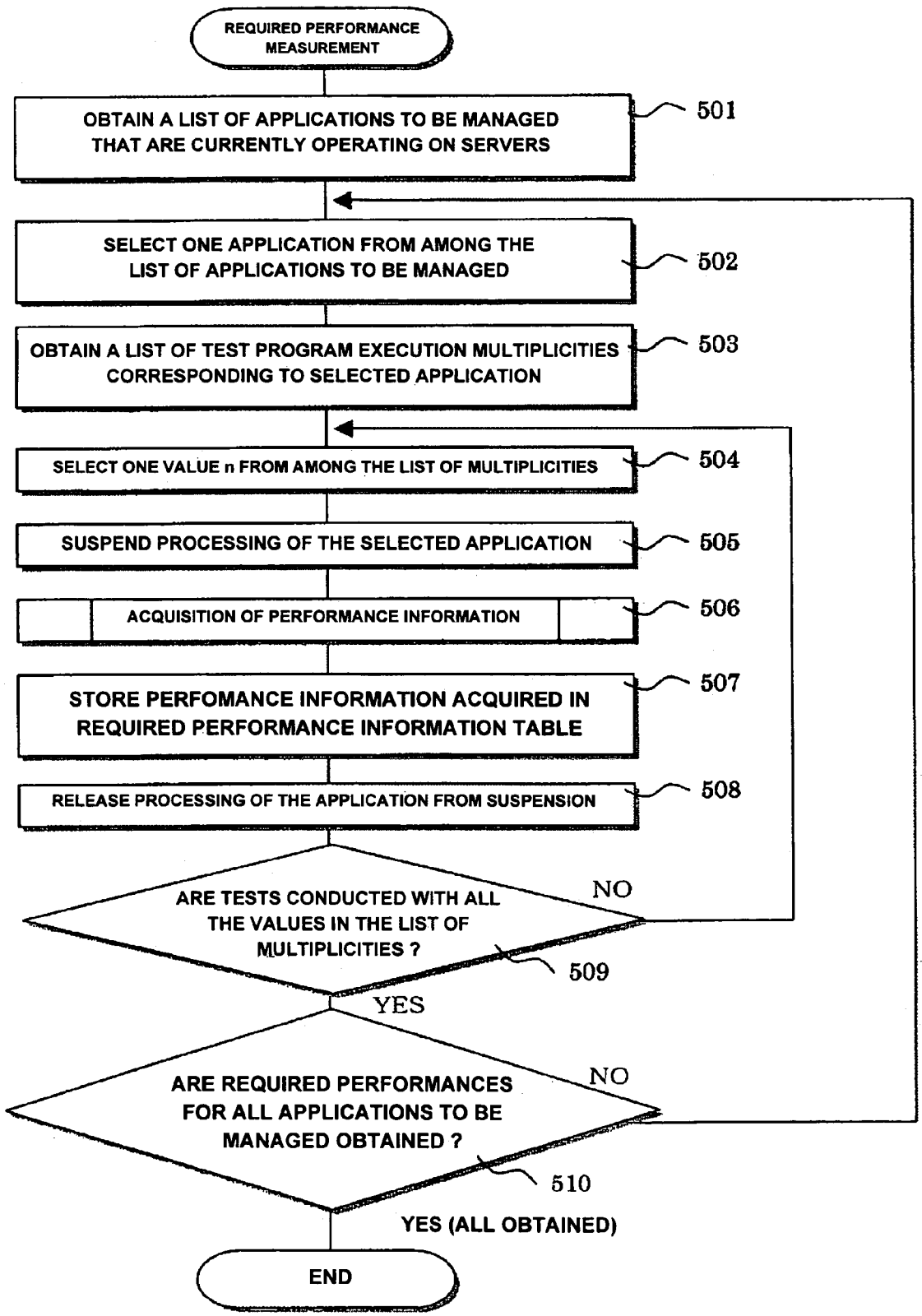
FIG. 5 is a flowchart for describing a required performance measuring program that is executed on a failure management target server.

FIG. 5 is a flowchart to describe a required performance measurement program that operates on all of the servers that are to be managed among the failure management target servers (the servers 203a through 203f in FIG. 2).

In step 501, a list of applications that are operating on the servers that are executing the required performance measurement program is obtained from the required performance information table (901 in FIG. 9). In step 502, one of the applications is selected from the list of applications. In step 503, a list of execution multiplicities corresponding to the selected application is created based on the multiplicity entry 904 of the required performance information table (901 in FIG. 9).

In step 504, one of the multiplicities (n) is selected from the list of multiplicities. In step 505, processing of the application selected in step 502 is temporarily stopped (suspended). In step 506, the multiplicity of n is designated, and the performance information acquisition program is executed (according to the flowchart in FIG. 3 and FIG. 4). In step 507, the elapsed times T1-T4 obtained as a result of the execution of the program are stored at the performance information entries 1-4 of the required performance information table (901 in FIG. 9), respectively. In step 508, the application temporarily stopped (suspended) is released from its suspension.

In step 509, the process proceeds to step 510 when required performance information for all of the multiplicities in the list of execution multiplicities has been obtained. If not, the process returns to step 504, and any one of the multiplicities which has not been executed is selected from the list of execution multiplicities. In step 510, the required performance measurement program ends when required performance information for all of the applications to be managed is obtained. If not, the program returns to step 502, and one of the applications that have not been measured is selected from the list of failure management target applications.

Figure 6:
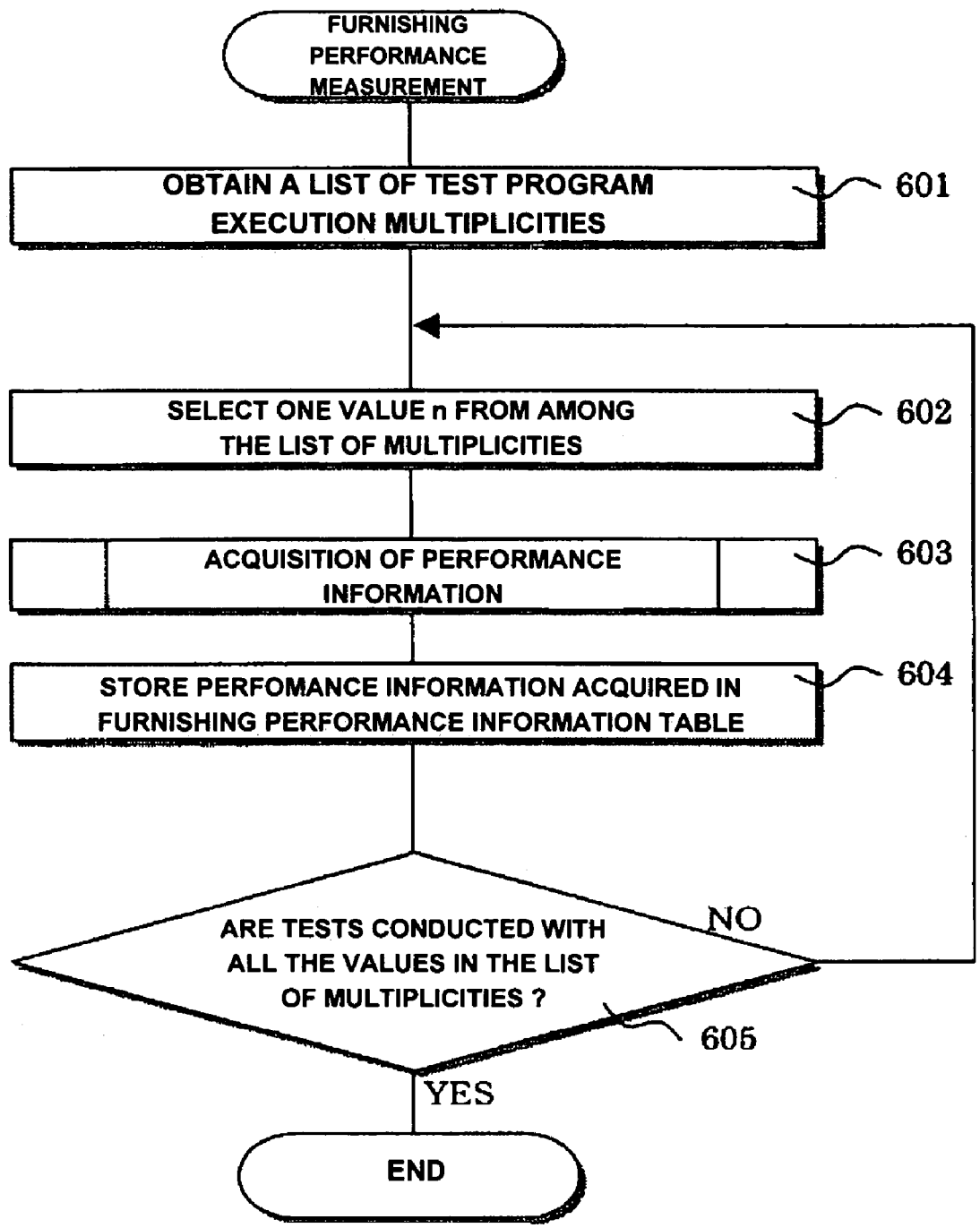
FIG. 6 is a flowchart for describing a furnishing performance measuring program that is executed on a failure management target server.

FIG. 6 is a flowchart to describe a furnishing performance measurement program that operates on all of the servers among the failure management target servers (the servers 203a through 203f in FIG. 2).

In step 601, a list of execution multiplicities excluding duplicates among all of the execution multiplicity values is obtained from the required performance information table (the table 901 in FIG. 9). For example, in the case of the table in FIG. 9, a list of execution multiplicities is {1, 2, 4, 8}.

In step 602, one value (n) among the list of multiplicities is selected. In step 603, the multiplicity of n is designated, and the performance information acquisition program (according to the flowchart in FIG. 3 and FIG. 4) is executed. In step 604, the resultant performance information obtained is stored in the required performance information table 1001 (FIG. 10) (for example, the row 1008 in FIG. 10 is updated). In step 605, the furnishing performance measurement program ends if the tests have been completed with all the values in the list of multiplicities, and if not, the process returns to step 602.

Required performance information and furnishing performance information can be obtained at various timings. In particular, for obtaining required performance, an application needs to be temporarily stopped (suspended) even for a short period of time, and therefore the measurement interval may preferably be made longer. In practice, the aforementioned measurement intervals for obtaining the required performance information and furnishing performance information may be appropriately decided by the user. Also, when performance information greatly changes with time, the dependability of the test results is affected. In such cases, there are measures to improve the dependability of the test results, such as, for example, averaging measurement data measured a plurality of times in a predetermined period of time.

Figure 7:
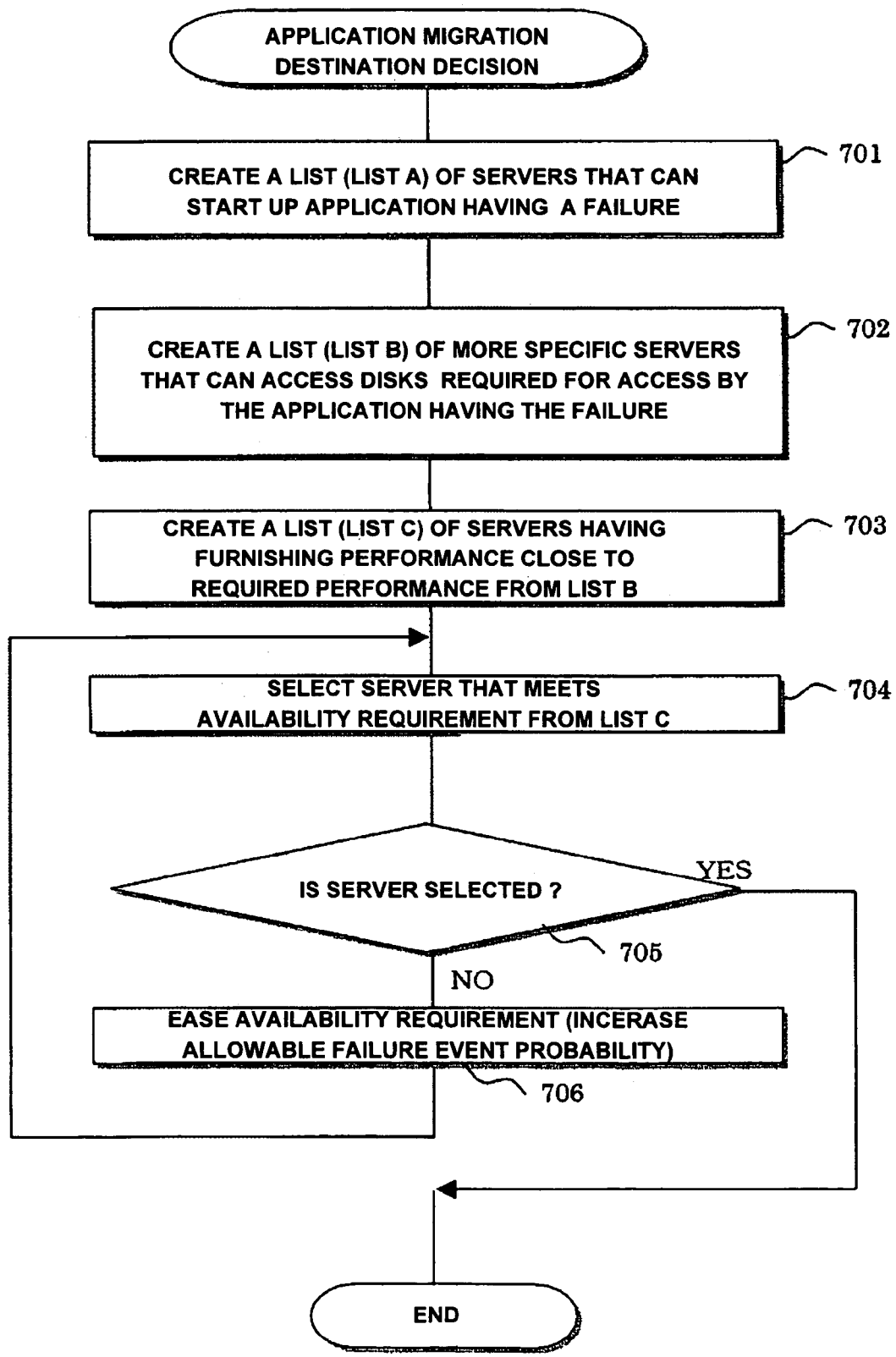
FIG. 7 is a flowchart for describing an application migration destination deciding program that is executed on a failure management server.

FIG. 7 shows a flowchart to describe an application migration destination deciding program for deciding a migration destination of an application. This program is called when a failure management program to be described with reference to FIG. 8 below detects an application failure, or detects a lowered availability even when an application failure does not occur. Server identifiers and application identifiers are provided to the application migration destination deciding program as input information.

Referring to FIG. 7, in step 701, a list of servers (a list A) that can start up an application that failed is created based on a "list of applications that can be used" (for example, a table 1209 in FIG. 12) in the server composition information table (FIG. 12). In step 702, all servers that can access storages that are needed to be accessed by the application that failed are searched from among accessible storage identifiers (for example, the lists 1203 and 1205) of the server composition information table (FIG. 12) and the application resource information table (FIG. 13), and outputted in a list B. In step 703, the required performance information table of FIG. 9, the furnishing information table of FIG. 10 and the application characteristic information table of FIG. 11 are used to rearrange the servers in the group in the list B in the order closer to the required performance of the application to create a list C. In this rearrangement, the following assessment formula of performance difference is defined.

$$D^2 = \sum_n \sum_k \rho(a, k)(T(s, n, k) - \hat{T}(s, a, n, k))^2 \qquad \text{(Formula 1)}$$

It is noted that T(s,a,n,k) is an elapsed time (required performance information) that is an execution result of a test program k that is executed on a server with a server identifier s with a multiplicity of n in a state in which an application with an application identifier a is temporarily stopped (suspended). This value can be obtained from the performance information of the required performance information table of FIG. 9. For example, when s=S1, a=A1, n=2, and k=4, the value T(s,a,n,k) corresponds to a value T24 in the row 909 of the required performance information table in FIG. 9. T(s,n, k) is an elapsed time (furnishing performance information) that is an execution result of a test program k executed on a server with a server identifier s with a multiplicity of n. This value can be obtained from the performance information of the furnishing performance information table of FIG. 10. For example, when s=S2, n=1, and k=4, the value T(s,n,k) corresponds to a value U34 in the row 1008 of FIG. 10. The value ρ(a,k) is a weight value for the test program k for an application with an application identifier a in the application characteristic information table (the table 1101 in FIG. 11). For example, when a=A2, and k=1, it is understood by referring to the entry 1103 of the table in FIG. 11 that the value is 1.

To show the benefit of Formula 1, let us compare Formula 1 with Formula 2 below that calculates a performance difference by simply multiplying a difference of elapsed times that are execution results of test jobs by itself.

$$d^2 = \sum_n \sum_k (T(s, n, k) - \hat{T}(s, a, n, k))^2 \qquad \text{(Formula 2)}$$

According to Formula 2, even when a switching destination of an application that does not comply with a multiprocessor to begin with is to be decided, the performance that is characteristic of the multiprocessor is compared in the same manner as other performances. There is usually no meaning to compare with the multiprocessor performance to decide a switching destination of an application. Also, in the case of a CPU-bound or I/O-bound application, it is necessary to give priority as a criteria to an assessment as to whether its CPU performance or I/O performance is close. In Formula 2, when d=0, there is a perfect match and no problem occurs. However, because performance information dynamically varies, and therefore the value d would never become 0 in reality. Therefore, it can be considered that the value d is not 0 (d≠0). However, because elapsed times obtained by executing test programs that are individually characteristic are treated equally, when servers that have performances close to one another are to be found, and when there are two or more servers having the values d that are about the same level, it is not known as to what characteristics of the servers result in the differences. As a result, when there are two or more servers having the values d that are small at about the same level, and when an application is actually operated on each of the servers, application execution performances become different from one server to the other.

To solve all of the problems described above, performance characteristics of applications are expressed by weights in the application characteristic information table (items 1103-1106 in FIG. 11), and differences between required performances and furnishing performances are compared using performance differences obtained by Formula 1 that is defined using weight information, such that the standard itself as to whether or not the performances are near is decided based on characteristics of applications. Therefore, even though the performances are compared using elapsed times measured by executing test jobs, the application execution performance that is actually migrated becomes close to the application execution performance that was achieved before the migration.

In step 704, the failure event probability of each server is calculated and evaluated in the order of the servers, rearranged based on the aforementioned performance difference evaluation method, whose furnishing performance is closer to the required performance. In step 705, the program ends when a server that meets the availability requirement is found, and if not, the program proceeds to step 706. In step 706, the availability requirement is eased (the maximum failure probability is increased), and the process returns to step 704 again.

In the evaluation of the availability in step 704, the availability is evaluated using the following failure event probability. First, when an elapsed time after starting an application is t, and an elapsed time after a product (server) is manufactured is X, the failure event probability of the product at this moment is calculated as follows:

$$h(t, X) = \lambda \exp(-\lambda t) + (bX^{b-1}/a^b)\exp(-(X/a)^a) \qquad \text{(Formula 3)}$$

The initial term is an exponential distribution, which is caused by an accident. The second term is an event probability of a failure that takes in consideration of the hardware lifetime of the server (Weibull distribution).

Values λ, a and b necessary to calculate this failure event probability are recorded at entries of average accidental failure rate λ (items 1403 of FIG. 14), increased failure rate coefficient a (items 1404 of FIG. 14), and increased failure rate coefficient b (items 1405 of FIG. 14) of the failure information table in FIG. 14. The values a and b are set in advance in consideration of the lifetime of the hardware. The value λ is set at its initial value when the system is introduced, but MTBF (Mean Time Between Failure) is calculated each time a failure occurs, and a value λ=1/MTBF is calculated, whereby the event probability of an accidental failure is updated to the latest value. Furthermore, the elapsed time X after the server is manufactured is recorded in the failure information table (at items 1406 of FIG. 14), and the elapsed time t after starting an application is recorded in the failure information table (at items 1407 of FIG. 14).

The evaluation in step 704 is conducted, using the continuous execution time 1107 of an application (the value is assumed to be X) and the upper limit value of the failure incident rate 1108 corresponding thereto (this value is assume to be Y), under conditions in which the probability of occurrence of a failure within X years from now should be below Y. Namely, integral values given by the following Formula 4 are evaluated.

$$\int\int_{\text{During X years from now}} h(t, x)\,dt\,dx < Y \qquad \text{(Formula 4)}$$

Figure 8:
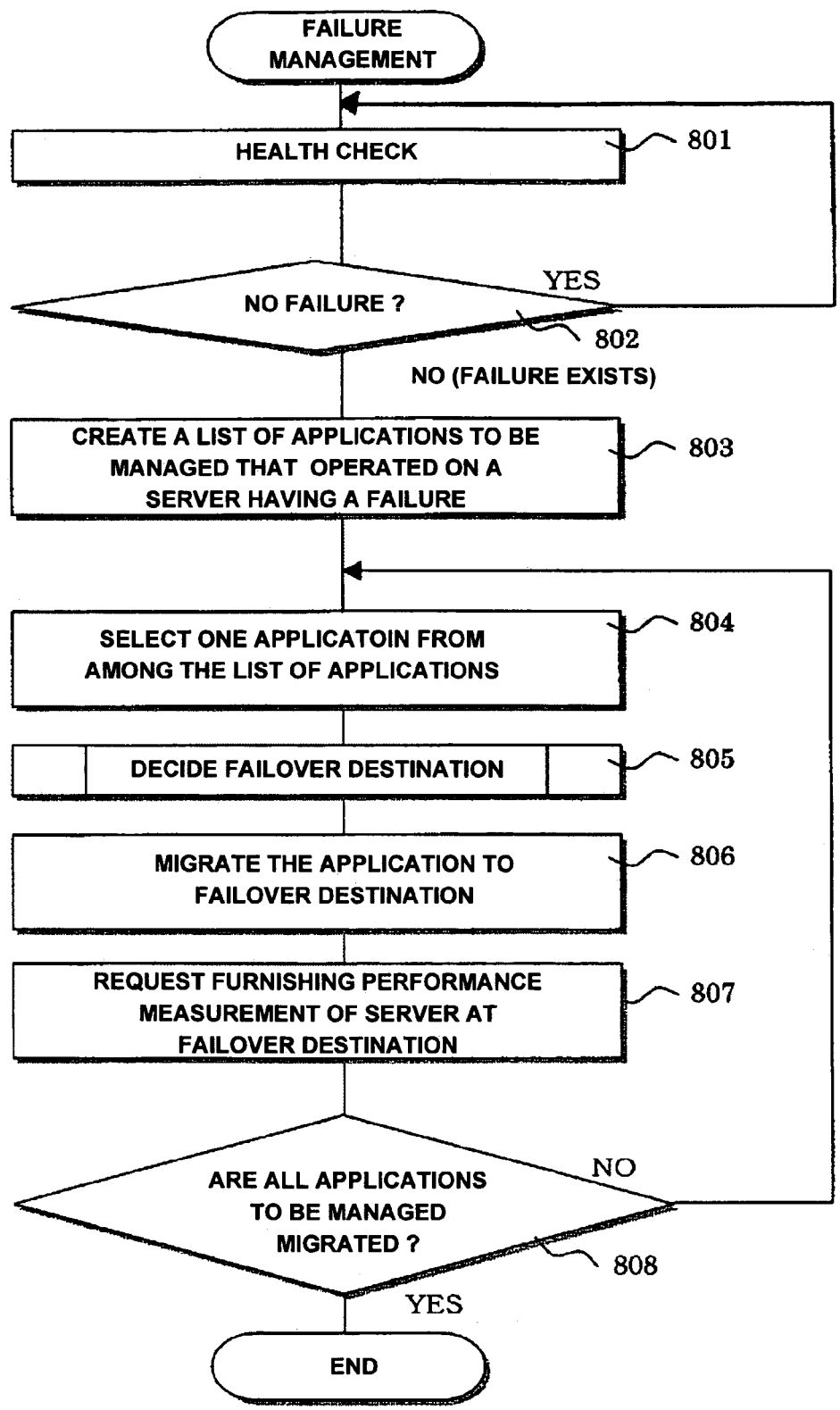
FIG. 8 is a flowchart for describing a failure management program that is executed on a failure management server.

Referring to the flowchart of FIG. 8, a failure management program that operates only on a failure management server is described. In step 801, health check is conducted to check a failure of any of the failure management target servers. The method to conduct health check can be realized by using a conventional method such as heartbeats. If a failure is not detected in any of the failure management target servers in step 802, the process returns to step 801, and if a failure is detected, the process proceeds to step 803. In step 803, a list of applications that have been operated on the failed server is obtained by using an application use resource information table (FIG. 13).

In step 804, one application is selected from the list of applications obtained in step 803. In step 805, the application migration deciding program in FIG. 7 is executed, using an application identifier of the selected application and a server identifier of the failed server as input information, to decide a failover destination. In step 806, the application is migrated to a server at the failover destination that is decided in step 805. As the migration method, a conventional failover method can be used. For example, when a failure occurs on a server, programs, data and various control information necessary for execution of the programs are migrated to another server at a migration destination, the operation of the failed server is then stopped, and thereafter the server at the migration destination is started to continue execution of the programs.

In step 807, 0 or a sufficiently large value is set at all of the furnishing performance information of the server at the migration destination listed in the furnishing performance information table, and a furnishing performance measurement request is sent to the server where the application has been migrated. The purpose of setting 0 or a sufficiently large value is to prevent the server from being selected again as a migration destination of another application until the furnishing performance thereof is measured again. In step 808, whether all of the management target applications that are managed by the failed server have been migrated is judged. The process returns to step 804 if all of the management target applications have not been migrated, and the process ends if all of the management target applications have been migrated.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for deciding a destination server among a plurality of servers to which applications are migrated upon occurrence of a failure, the method comprising the steps of:
   obtaining required performance information of each of the applications when each of the plurality of servers is normally operating;
   obtaining furnishing performance information of each of the plurality of servers in operation;
   extracting at least one of the servers as a representative server from among the plurality of servers to which the applications may be migrated;
   comparing the required performance information and the furnishing performance information, thereby specifying at least one of the servers having an application execution performance that is close to an application execution performance of a server that is failed; and
   deciding one of the at least one of the servers specified as the destination server that has a minimum load change after migrating the applications.

2. A server deciding method used for a system that migrates applications operated on a first server to a second server when the first server has a failure, the method comprising the steps of:
   obtaining required performance information of each of the applications when the first and second servers are normally operating;
   obtaining furnishing performance information of the first and second servers in operation;
   comparing the required performance information and the furnishing performance information;
   minimizing a change in application performance before and after the failure; and
   increasing an availability after the failure.

3. A method for deciding a destination server among a plurality of servers to which applications are migrated upon a failure of one of the plurality of servers, the method comprising the steps of:
   executing test programs having a plurality of different characteristics while changing an execution multiplicity of each of the test programs, thereby obtaining required performance information of each of the applications when each of the plurality of servers is normally operating;
   obtaining furnishing performance information of each of the plurality of servers in operation to extract at least one of the servers as a representative server from among the plurality of servers to which the applications may be migrated;
   comparing the required performance information and the furnishing performance information, thereby specifying at least one of the servers having an application execution performance that is close to an application execution performance on the server having the failure; and
   deciding one of the at least one of the servers specified as the destination server that has a minimum load change after migration of the applications.

4. A method according to claim 3, wherein the test programs have different execution modes and are executed on at least one of the servers while changing an execution multiplicity of each of the test programs to measure an elapsed time for executing the each of the test programs.

5. A method according to claim 3, wherein the step of obtaining the required performance information includes the steps of temporarily suspending each of the applications on at least one of the plurality of servers, and executing the test programs with execution multiplicities corresponding to the each of the applications that is suspended.

6. A method according to claim 3, wherein the step of obtaining the furnishing performance information includes the step of executing the test programs on at least one of the servers with execution multiplicities that are applicable to the at least one of the servers.

7. A method according to claim 3, wherein the step of extracting the representative servers includes the step of extracting, from among the plurality of servers, representative servers that generally meet required performance of the applications, and the step of deciding one of the representative servers according to performance difference evaluation based on performance difference and failure event probability.

8. A method according to claim 3, wherein each of the test programs has a different execution mode, and is one of a program that is parallel executable and uses only a CPU, a program that is non-parallel executable and uses only a CPU, a program that executes inputs and outputs on a simultaneously accessible storage, and a program that executes inputs and outputs on a simultaneously inaccessible storage.

9. A method for deciding a destination server among a plurality of servers to which applications are migrated upon occurrence of a failure, the method comprising the steps of:
   obtaining required performance information of each of the applications when each of the plurality of servers is normally operating; obtaining furnishing performance information of each of the plurality of servers in operation;
   specifying at least one of the servers having a composition for running the applications migrated upon occurrence of a failure on one of the servers;
   comparing the required performance information and the furnishing performance information; and
   specifying one of the servers that has an application execution performance closest to an application execution performance on the server having the failure, and that meets a specified availability.

10. A computer system comprising a plurality of servers mutually connected through a communication module,
   wherein one of the plurality of servers includes a plurality of CPU's;
   a module for obtaining required performance information of each application when each of the plurality of servers is normally operating;
   a module for obtaining furnishing performance information of each of the plurality of servers in operation;
   a module for specifying at least one of the servers having a composition for running the applications migrated upon occurrence of a failure on one of the servers;
   a module for comparing the required performance information and the furnishing performance information to select one of the at least one of the servers specified that has an application execution performance closest to an application execution performance on the server having the failure.

11. A computer system for deciding a destination server among a plurality of servers mutually communicatably connected to which applications are migrated upon a failure of one of the plurality of servers, the computer system comprising: a plurality of CPU's;
   a module for executing test programs having a plurality of different characteristics, thereby obtaining required performance information of each of the applications when each of the plurality of servers is normally operating;
   a module for obtaining furnishing performance information of each of the plurality of servers in operation to extract at least one of the servers as a representative server from among the plurality of servers to which the applications may be migrated;
   a module for comparing the required performance information and the furnishing performance information, thereby specifying at least one of the servers having an application execution performance that is close to an application execution performance on the server having the failure; and
   a module for deciding one of the at least one of the servers specified as the destination server that has a minimum load change after migration of the applications.

12. A computer system according to claim 11, wherein each of the test programs has a different execution mode and is executed on at least one of the servers while changing an execution multiplicity of the each of the test programs to measure an elapsed time for executing the each of the test programs.

13. A computer system according to claim 11, wherein the module for obtaining the required performance information temporarily suspends each of the applications on at least one of the plurality of servers, and executes the test programs with execution multiplicities corresponding to the each of the applications that is suspended.

14. A computer system according to claim 11, wherein the module for obtaining the furnishing performance information executes the test programs on at least one of the servers with execution multiplicities that are applicable to the at least one of the servers.

15. A computer system according to claim 11, wherein the module for extracting the representative servers extracts, from among the plurality of servers, representative servers that generally meet required performance of the applications, and decides one of the representative servers according to performance difference evaluation based on performance difference and failure event probability.

16. A computer system according to claim 11, wherein each of the test programs is one of a program that is parallel executable and uses only a CPU, a program that is non-parallel executable and uses only a CPU, a program that executes inputs and outputs on a simultaneously accessible storage, and a program that executes inputs and outputs on a simultaneously inaccessible storage.

17. A computer readable storage medium having computer readable program code to be executed on a computer system for deciding a destination server among a plurality of servers mutually communicatably connected to, which applications are migrated upon a failure of one of the plurality of servers, the program code causing a computer to enable migration of the applications by performing the steps of:
   executing test programs having a plurality of different characteristics, thereby obtaining required performance information of each of the applications when each of the plurality of servers is normally operating;
   obtaining furnishing performance information of each of the plurality of servers in operation to extract at least one of the servers as a representative server among the plurality of servers to which the applications may be migrated;
   comparing the required performance information and the furnishing performance information, thereby specifying at least one of the servers having an application execution performance that is close to an application execution performance on the server having the failure; and
   deciding one of the at least one of the servers specified as the destination server that has a minimum load change after migration of the applications.

18. A computer readable storage medium according to claim 17, wherein each of the test programs has a different execution mode and is executed on at least one of the servers while changing an execution multiplicity of the each of the test programs to measure an elapsed time for executing the each of the test programs.

19. A computer readable storage medium according to claim 17, wherein the step of obtaining the required performance information includes the steps of temporarily suspending each of the applications on at least one of the plurality of servers, and executing the test programs with execution multiplicities corresponding to the each of the applications that is suspended.

20. A computer readable storage medium according to claim 17, wherein the step of obtaining the furnishing performance information includes the step of executing the test programs on at least one of the servers with execution multiplicities that are applicable to the at least one of the servers.

21. A computer readable storage medium according to claim 17, wherein the step of extracting the representative servers includes the steps of extracting, from among the plurality of servers, representative servers that generally meet required performance of the applications, and deciding one of the representative servers according to performance difference evaluation based on performance difference and failure event probability.

22. A computer readable storage medium according to claim 17, wherein each of the test programs is one of a program that is parallel executable and uses only a CPU, a program that is non-parallel executable and uses only a CPU, a program that executes inputs and outputs on a simultaneously accessible storage, and a program that executes inputs and outputs on a simultaneously inaccessible storage.

* * * * *